United States Patent
Zhang et al.

(10) Patent No.: US 7,754,102 B2
(45) Date of Patent: Jul. 13, 2010

(54) METHOD FOR RECLAIM OF CARBON DIOXIDE AND NITROGEN FROM BOILER FLUE GAS

(75) Inventors: Fengshan Zhang, Panjin (CN); Yuanwen Gao, Panjin (CN); Yongchun Zhang, Dalian (CN)

(73) Assignee: CNPC Greatwall Drilling Engineering Company Ltd., Beijing (CN)

( * ) Notice: Subject to any disclaimer, the term of this patent is extended or adjusted under 35 U.S.C. 154(b) by 0 days.

(21) Appl. No.: 11/983,792

(22) Filed: Nov. 9, 2007

(65) Prior Publication Data

US 2009/0101868 A1 Apr. 23, 2009

(30) Foreign Application Priority Data

Oct. 22, 2007 (CN) .......................... 2007 1 0163245

(51) Int. Cl.
*C01B 31/16* (2006.01)
(52) U.S. Cl. .......................... 252/184; 95/180; 95/181; 95/183; 55/385.1; 55/418
(58) Field of Classification Search ................. 252/184; 95/180, 181, 183; 166/90.1; 96/235; 55/418, 55/385.1
See application file for complete search history.

(56) References Cited

U.S. PATENT DOCUMENTS

| | | | |
|---|---|---|---|
| 5,185,139 A * | 2/1993 | Krishnamurthy et al. .... | 423/359 |
| 2008/0236114 A1 * | 10/2008 | Zhang et al. ................ | 55/385.1 |
| 2008/0236117 A1 * | 10/2008 | Zhang et al. ................ | 55/418 |

FOREIGN PATENT DOCUMENTS

CN 101053751 A * 10/2007

OTHER PUBLICATIONS

Zhaoping Zhong, Baosheng Jin, Yaji Huang, Hongcang Zhou, Mingyao Zhang, Experimental study on flue gas purifying of MSW incineration using in-pipe jet adsorption techniques, Waste Management 28 (2008) 1923-1932,2007 Elsevier Ltd. All rights reserved.*

* cited by examiner

*Primary Examiner*—Harold Y Pyon
*Assistant Examiner*—Bijan Ahvazi
(74) *Attorney, Agent, or Firm*—Sofer & Haroun, LLP

(57) ABSTRACT

This invention discloses a method for the reclaim of carbon dioxide and nitrogen from boiler flue gas, which includes: the flue gas enters into the water-washing and desulfurizing tower from the inferior part and contacts the sulfide solution flowing backward for the cleaning and desulfurizing of the flue gas; the desulfurized flue gas is introduced to the inferior part of the chemical absorber, where the contained carbon dioxide contacts the carbon dioxide adsorption liquid (containing, by the total weight of the liquid, of, besides water, 20-60% water solution of compound amine, 5-10% polyoxinolum, 1-5% antioxygen and 1-5% corrosion inhibitor) flowing backward; The adsorption liquid coming from the bottom of the absorber and having absorbed carbon dioxide, after heated when passing through heat exchangers, is sent to the top of the carbon dioxide regenerator and flows down through the packing layer; carbon dioxide is emitted out from the top of the regenerator; Nitrogen separated out from the top of the chemical absorber is freeze dried to reduce the content of saturated water to lower than 1.0%. This invention discloses a piece of equipment for the reclaim of carbon dioxide and nitrogen from boiler flue gas.

7 Claims, 1 Drawing Sheet

METHOD FOR RECLAIM OF CARBON DIOXIDE AND NITROGEN FROM BOILER FLUE GAS

RELATED APPLICATION

Figure 1:
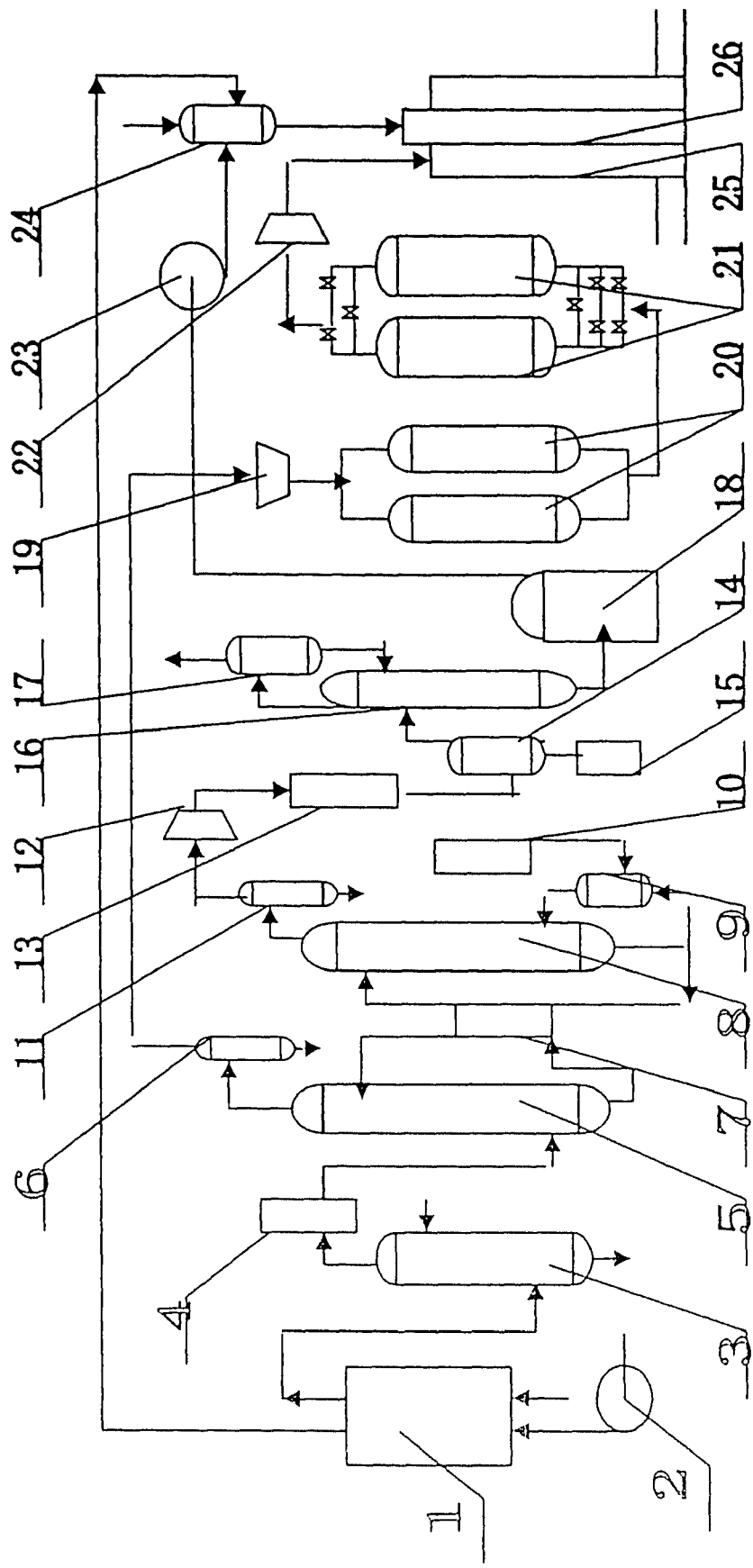

This application claims the benefit of priority from Chinese Patent Application No. 200710163245.6, filed on Oct. 22, 2007, the entirety of which is incorporated herein by reference.

FIELD OF THE INVENTION

This invention relates to a method for the reclaim of carbon dioxide and nitrogen from boiler flue gas, especially from the flue gas of steam boilers used in oil fields. The reclaimed carbon dioxide and nitrogen can be employed to assist the exploitation of thick crude oil (or called "dense" crude oil).

BACKGROUND OF THE INVENTION

In oil fields, the reservoir bed belonging to the continental facies bears considerable heterogeneity during the process of sedimentation. Part of the crude oil containing water has fast rising velocity for its high viscosity. In addition, the exploitation of many oil fields has entered into the middle or later period: though a series of measures such as water or steam injection have been taken, the recovery efficiency of crude oil is still low, the exploitation cost is high, and a lot of original oil in-place is difficult to or even cannot be exploited economically. Worse still, the recovery efficiency is even lower while the cost is even higher with regard to low permeable oil, thick oil as well as crude oil of condensate gas reservoirs. In the prior art, gases for tests of oil recovery by gas injection mainly include steam, carbon dioxide and nitrogen.

In the prior art, natural gas injection into the oil field is also one of the commonly used methods for oil recovery. Fairly favorable results can be obtained for the following reason: natural gas possesses some properties of crude oil in oil reservoirs and would not cause any harm to the oil bed; in sequence, miscibility can be obtained under relatively low pressures or in the process of flooding. However, the technology is, to a certain extent, restricted by economic factors for the rising price of gas hydrate (including natural gas), which, as a result, motivates the studies on the injection of other gases, especially carbon dioxide and nitrogen.

It is an effective approach to improve the exploiting effect of oil fields and increase oil recovery efficiency to flood carbon dioxide and/or nitrogen into the oil fields on the basis of traditional steam injection. Having high solubility in both water and oil, carbon dioxide, when solved into crude oil in huge amount, can expand the volume as well as decrease the viscosity of the crude oil. During the process of miscible flooding, carbon dioxide extracts and gasifies the light components contained in the crude oil, and in this way the interfacial tension is reduced and flooding is carried out. Meanwhile, carbon dioxide bears the excellent functions of improving mobility ratio, extracting and gasifying light hydrocarbons in crude oil as well as increasing, by molecular diffusion, the permeability of oil reservoirs, etc.

Flue gas of combustors such as boilers etc. consists of carbon dioxide and nitrogen, two key and economical gases for oil recovery by gas injection. With coal, gas or oil as the fuel, combustors including boilers used in oil fields usually produce flue gas containing 9%~15% carbon dioxide (by volume), 0%~85% nitrogen (by volume) and slight quantity of oxygen, sulfur dioxide and water.

Reclaim of carbon dioxide from flue gas of coal, gas or oil boilers may protect the environment and realize environment-friendly production. As the dominating component of greenhouse gases, carbon dioxide exerts non-negligible negative influence on the global ecological system, on the economic development as well as on the health and life quality of human beings. A critical point for minimizing the greenhouse effect is to restrict the content of carbon dioxide in the atmosphere. Therefore, reclaim of carbon dioxide has tremendous significance, considered from the viewpoint of tackling the greenhouse effect problem. Therefore, it is of great significance to reclaim carbon dioxide from flue gas of combustor so as to apply it in gas injection oil producing technology, which may not only increase the crude oil output but also reduce pollution to the environment.

Nitrogen has low solubility in water and the similar viscosity as methane for its larger compressibility and formation volume factor than other gases. As an inert gas, it has no toxicity or corrosivity or flammability; mixture of nitrogen with most of fluids always presents in the phase of cystose, which may have certain lifting influence on the fluids. The above properties enables nitrogen to improve the recovery efficiency of oil by various flooding modes such as immiscible flooding, miscible flooding, gravity flooding, combination flooding and water-gas alternating flooding, etc.

Thermal recovery has dominated the exploitation mode of some thick crude oil blocks in some oil fields. Take wet steam generator (23 ton thermal recovery boiler) for example: with natural gas as the fuel, each boiler discharges approximately 480 million $Nm^3$ of flue gas per year, which, if used as the proximal gas resource of carbon dioxide and nitrogen, may drastically lower the oil recovery cost and provide optimal resources for oil recovery by flue gas injection.

Gas injection into the oil well is an important technology for improving the oil recovery efficiency by reducing interfacial tension, lowering the viscosity of crude oil and restoring or maintaining the reservoir pressure when gases and crude oil form into immiscible or miscible phase for different gases and under different reservoir conditions.

The primary components of flue gas of steam-injection boilers, in the process of thermal recovery of thick oil by steam injection, are carbon dioxide and nitrogen. As is presented by studies, combination of steam boilers and mate flue gas reclaim equipment may realize the selective injection of steam, carbon dioxide, nitrogen or their mixture, which not only acquires satisfactory results of outcome increase but also is conducive to the environment protection.

Unfortunately, for various reasons, in the prior art, oil recovery by $CO_2$ or $N_2$ is in the pre-feasibility study period as a single technology and mature technology or equipment has not been developed yet.

SUMMARY OF THE INVENTION

The object of the invention is to provide a method for the reclaim of carbon dioxide and nitrogen from boiler flue gas. The said method comprises the following steps of:

Washing flue gas with water for dust removal and then making water-washed flue gas to contact with sulfite solution for desulfurization;

Reusing adsorption liquid after sulfide products are obtained;

Separating desulfurized flue gas by cyclone and sending desulfurized flue gas by an induced draft fan to a carbon dioxide absorber, wherein part of the carbon dioxide is absorbed by a carbon dioxide adsorption liquid and exhaust gas, which is emitted from the top of the carbon dioxide absorber, is, after the contained water is separated out, used as the material gas for the production of nitrogen. The said carbon dioxide adsorption liquid comprises besides water, 20-60 wt % water solution of compound amines, 5-10 wt % polyoxinolum, 1-5 wt % antioxygen and 1-5 wt % corrosion inhibitor based on the total weight of the carbon dioxide adsorption liquid;

providing liquid rich in carbon dioxide to a carbon dioxide heat exchanger and then to a rich-lean liquid heat exchanger and, after the heat is reclaimed, to a carbon dioxide regenerator;

Separating the desorbed carbon dioxide coupled with water vapor, after heat exchange and cooling, for the removal of the water, to resolve carbon dioxide as a product with purity of over 98.0%;

providing condensate water separated from regenerated gas to the carbon dioxide regenerator;

providing the adsorption liquid rich in carbon dioxide into the carbon dioxide regenerator from the top, wherein part of the carbon dioxide is desorbed by stripping, and then providing carbon dioxide adsorbed liquid into a reboiler for further desorption of the carbon dioxide;

Making liquid lean in carbon dioxide flow out of the carbon dioxide regenerator from the bottom via exchanging heats in the rich and/or lean liquid heat exchangers into a water cooler and, after being cooled down, providing the liquid lean in carbon dioxide into the carbon dioxide absorber; and Freeze drying a nitrogen stream separated from the top of the carbon dioxide absorber for dehydration.

According to the present invention, the said carbon dioxide adsorption liquid consists of besides water, 20-60 wt % water solution of compound amines, 5-10 wt % polyoxinolum, 1-5 wt % antioxygen and 1-5 wt % corrosion inhibitor based on the total weight of the carbon dioxide adsorption liquid.

In the present invention, the said carbon dioxide adsorption liquid has a density of 0.98~1.06 g/ml, a kinetic viscosity of 31.5~35.0 mm$^2$/s, a surface tension of 0.04~0.05 N/m and a specific heat of 0.84~0.90 cal/g° C.

Preferably, a water solution of the said compound amine according to the present invention comprises 10-30% by weight component (A) selected from a group consisting of monoethanolamine (MEA), diethanolamine (DEA) and piperazine (PZ) or combinations thereof; and 70-90% by weight component (B) selected from a group consisting of 2-amino-2-methyl-1-propanol (AMP), N-methyldiethanolamine (MEDA) and triethanolamine (TEA) or combinations thereof based on the total weight of the solution.

The said component (A) is a category or several categories of amines with high reaction velocity for inducing the occurrence of adsorption reaction and increasing the velocity of adsorption; the said component (B) is a category or several categories of amines with low reaction velocity for increasing the adsorption capacity.

Joint actions between the two types of active amines are characterized by a large adsorption capacity and a high purification capability to carbon dioxide as well as a low energy cost.

In other words, in the said carbon dioxide adsorption liquid of the present invention, the amines with high reaction velocity of a component (A) include monoethanolamine (MEA), diethanolamine (DEA) and piperazine (PZ) or the combinations thereof and the component (A) is in amount of 10-30% of the total weight of the water solution of compound amines. The amines with low reaction velocity of a component (B) include 2-amino-2-methyl-1-propanol (AMP), N-methyldiethanolamine (MEDA) and triethanolamine (TEA) or the combinations thereof and the component (B) is in amount of 70-90% of the total weight of the water solution of compound amines.

The said polyoxinolum, an organic solvent with stable chemical properties and outstanding thermal stability, has low volatilization loss and is difficult to be degraded in use. Having low corrosivity, it demonstrates, to carbon dioxide, strong selective adsorption capability under pressurized conditions and excellent desorption capability under depressurized conditions.

In the present invention, optionally the carbon dioxide adsorption liquid further comprises a sodium orthovanadate as a corrosion inhibitor. The corrosion inhibitor refers to for example sodium orthovanadate, which may reduce the corrosion rate of the solution on the equipment to less than 0.1 mm/a. Optionally the carbon dioxide adsorption liquid further comprises an antioxygen agent that refers to sodium sulfite or mixture thereof with copper acetate, which may inhibit the formation of peroxides, interrupt the occurrence of degradation reaction chain and thus effectively control the generation of degrading products-organic acids.

The said water solution of compound amines in the invention may not only reclaim carbon dioxide by fully utilizing the "adsorption-heat & regeneration" technology, but also facilitate the reclaim of carbon dioxide with the pressure of the system itself. The amount of polyoxinolum in it may be increased or decreased according to the pressure of the material gases in the art.

According to the present invention, flue gas of coal or natural gas boilers always contain water, the original data of which is, in general, the content of saturated water under high temperatures. With current available technologies, after the flue gas is washed with water for dust removal and the carbon dioxide is absorbed by chemical solvents, the gas emitted from the top of the absorber contains approximately 7.31% saturated water under 40° C.; Also, after desorption through the regenerator, the content of saturated water in carbon dioxide is that under 40° C.

The adoption of sulfite flue gas desulfurization technology during the process of water-washing purification may remove over 95% of the sulfur dioxide. During the process of adsorption by alkaline decarbonization solution, the said decarbonization solution also contains solvents that may absorb sulfur dioxide and nitrogen oxides. So it may be considered that sulfur dioxide and nitrogen oxides have been cleaned up in this procedure. Therefore, basically, no sulfides or nitrogen oxides exist in the gas flow of carbon dioxide and nitrogen obtained after treatment with the method in accordance with the present invention.

As a resource reclaiming technology for flue gas desulfurization, sulfite flue gas desulfurization employs sulfite solution of metals as adsorption liquid, in which the metal ions, in liquid phase, catalyzes the oxidation reaction of sulfur dioxide and produces polymerized ferric sulfate while maintaining high desulfurization rate simultaneously. Co MPared with limestone/limegypsum wet flue gas desulfurization, which is frequently used in current technologies, the sulfite flue gas desulfurization does not produce solid wastes and has no secondary pollution, and thus is a more environment-friendly flue gas desulfurization technology.

In the present invention, after the boiler flue gas is washed with water, absorbed by alkaline decarbonization solution and separated with cyclone, the preferential temperature is about 60° C. and the preferential pressure is normal pressure as to the outlet for the emission of flue gas.

Flue gas treated with the method provided by the present invention contains a slight quantity of oxygen, which, when injected into the oil bed, may cause combustion under low temperatures and reduce the viscosity of crude oil. The heat expansion effect of oxygen may play a positive role in displacing oil. As a result, approximately 7.0% of oxygen may be kept in the flue gas. Additionally, a certain amount of water contained in the flue gas has no threat to the equipment or well pipes, for nitrogen has no corrosivity. However, excessive water will corrode the well pipes and should be removed step by step. A preferential method to solve the problem is, with a lyophilizer, to reduce the water content in nitrogen to lower than 1.0% and enabling it to meet the requirement of use. According to calculation, if the temperature of the nitrogen flow is lowered to 10° C. with a lyophilizer, the content of saturated water can be reduced to less than 1.0% under 0.7 MPa. That is to say, the dehydration may be completed with just a lyophilizer.

According to the invention, the method of the present invention, in brief, includes: the flue gas experiences steps of water washing, cooling and dust removing to clean up sulfur dioxide and nitrogen oxides; the desulfurized flue gas enters into a blower and the carbon dioxide is absorbed with chemical solvent adsorption; then the carbon dioxide is separated and concentrated in the regenerator and dehydrated by freeze drying; after the pressure is increased to approximately 16 MPa, the carbon dioxide is ready for injection into the well; the nitrogen free from carbon dioxide can be injected into the well after dehydrated by freeze drying and pressurized to 16 MPa. In this way, three gases, namely steam, carbon dioxide gas and nitrogen gas, are obtained one by one from a boiler and injected respectively by the gas regulatory system into the well for use.

The invention also relates to a carbon dioxide adsorption liquid, comprising besides water, 20-60% water solution of compound amines, 5-10% polyoxinolum, 1-5% antioxygen and 1-5% corrosion inhibitor based on the total weight of the said carbon dioxide adsorption liquid.

The said water solution of compound amine (by the total weight of the solution) is composed of 10-30% (preferably 15-20%) by weight component (A) selected from a group consisting of monoethanolamine (MEA), diethanolamine (DEA), piperazine (PZ) or their combinations; and 70-90% (preferably 80-85%) by weight component (B) selected from a group consisting of 2-amino-2-methyl-1-propanol (AMP), N-methyldiethanolamine (MEDA), triethanolamine (TEA) or their combinations.

The component (A) is a category or several categories of amines with high reaction velocity for inducing the occurrence of adsorption reaction and increasing the velocity of adsorption; the component (B) is a category or several categories of amines with low reaction velocity for increasing the adsorption capacity.

In the prior art, when reacting with carbon dioxide, the conventional chemical solvent MEA will produce fairly stable carbamates, which demands more energy for degradation in the process of regeneration and consequently costs larger regenerating energy. In addition, carbamates have strong corrosivity to the equipment and may produce incrustation easily. The reaction formula between MEA and carbon dioxide is as follows:

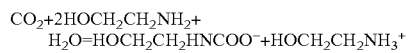

It can be understood from the formula that the maximum adsorption capacity of MEA to carbon dioxide is 0.5 mol $CO_2$/mol MEA.

During the process of carbon dioxide reclaim, MEA may be degraded by heat and by chemical reactions with oxygen, carbon dioxide, sulfides etc. Oxidative degradation is the leading culprit for the increase of energy cost in the degradation of MEA. The intermediate and end products of degradation between MEA and oxygen are peroxides and aminoacetic acid etc., respectively. The degrading products of MEA and carbon dioxide are oxazolidinones. The degradation of MEA has long been a headache in the reclaim of carbon dioxide by MEA method.

Besides, another severe technical problem in the reclaim of low differential pressure carbon dioxide by traditional MEA method is corrosion to the equipment, which is caused principally by the carbamates produced in the reaction of MEA and carbon dioxide as well as by the products of MEA chemical degradation.

Contained in the carbon dioxide adsorption liquid provided by the invention are many categories of active amines, of which the MEA, DEA and PZ has fast adsorption velocity and, when added, may increase the adsorption rate; the MDEA, TEA and AMP has huge adsorption capacity and, when added, may expand the adsorption capacity. Combination of the two will get large adsorption capacity as well as excellent adsorption/desorption velocity. Additionally, added into the solution of compound amines are antioxygens and preservatives, which may inhibit the formation of peroxides, interrupt the occurrence of degradation reaction chain and thereby solve the problems of oxidative degradation and corrosion of the adsorption liquid. Needless to say, the invention bears large adsorption capacity and high purification rate to carbon dioxide and has low corrosivity, low solvent consumption and low reclaim energy cost. With it, carbon dioxide with high concentration may be obtained.

The main properties of the carbon dioxide adsorption liquid of the present invention are: density 0.98~1.06 g/ml, kinetic viscosity 31.5~35.0 mm$^2$/s, surface tension 0.04~0.05 N/m and specific heat 0.84~0.90 cal/g° C.

Determination of the circulation volume of the carbon dioxide adsorption liquid provided by the invention: the adsorption capacity of the carbon dioxide adsorption liquid is about 19.5 Nm$^3$/m$^3$ liquid.

According to the invention, the said flue gas of the boiler, after heat exchange, enters into the water scrubber from the inferior part under the effect of an induced draft fan, contacts with the sulphite solution flowing from the top down and is cooled instantly. At the same time, the dusts contained in the gas are cleaned up by water-washing and the sulfur dioxide is absorbed and deposited in the sink at the bottom of the scrubber for periodical disposals. After water-scrubbing and desulfurization, the flue gas is purified and flows out of the water-scrubbing and desulfurizing tower.

Flue gas free of dusts and sulfides is introduced into the chemical absorber and during the process of flow from the bottom up, the carbon dioxide in the mixed gas is absorbed by carbon dioxide adsorption liquid flowing from the top down. The adsorption liquid, after absorbing carbon dioxide, is pumped to the regenerator. The end gas, which is basically free of carbon dioxide, is introduced out of the absorber from the top and, after cooled for water separation, is used as injecting nitrogen into the well.

The adsorption liquid, which has absorbed carbon dioxide, comes out of the absorber from the bottom and is pumped to rich liquid heat exchanger, where its temperature is raised; and then goes through the rich-lean liquid heat exchanger, where it's heated; and then is sent to the top of the regenerator to flow down through the packing layer, where it is further heated by the tower kettle steam and now, the carbon dioxide in the adsorption liquid is released and emitted out from the top of the absorber. The alkaline adsorption liquid basically free of carbon dioxide is cooled down when passing through the rich-lean liquid heat exchanger and then pumped to the absorber; it is cooled by the lean liquid cooler in the path and then returns to the superior part of the absorber for repeated use.

Before flowing through the heat exchanger, about 1% flow of the lean liquid coming from the bottom of the regenerator is introduced into the amine-reclaim heater and after heated by steam, the amines in the solution are vaporized into the regenerator for reuse and the raffinate at the bottom of the heater is introduced out to act as neutralizer of spent acid and after becoming neutral, sent out of the system for use. The bottom of the regenerator is heated indirectly by the medium-pressure steam introduced from the boiler.

The carbon dioxide gas coming from the top of the regenerator passes through rich liquid heat exchanger, where it is cooled; and then water cooler, where its temperature is decreased to around 40° C.; and then the separator, where condensed water is separated and returned to the underground tank for the preparation of alkalis. The gas, as the carbon dioxide product, is sent to gas injection regulatory system.

The carbon dioxide gas is introduced from the top of the regenerator through channels and entered into the compressor to be pressurized, under normal pressure and <40° C., to 0.7 MPa; and then into the lyophilizer, where its dew point is decreased; and then into the water segregator, where water is separated by cyclone separator and discharged into waste water drains and the gas comes out of the water segregator from the top and enters into the pressurizer, where it is pressurized in two-stage to 16.0 MPa; and then into the mixing tank and is injected into the well.

According to the invention, the reclaimed carbon dioxide and nitrogen gas can be used directly. Besides, the carbon dioxide gas may be compressed by a carbon dioxide compressor, liquefied by a liquefier and rectified by a rectifying tower and then stored in the storage tank to produce liquid carbon dioxide for injection into the well after pressurized by a pump.

The end gas, after compressed, dried and absorbed, may generate 96% nitrogen, which may be injected into the well after pressurized. In this way, steam, liquid carbon dioxide and nitrogen reclaimed from the boiler can be injected into the well under regulation, and thereby, the object of increasing the crude oil output and protecting the environment is achieved.

It can be seen that, the invention, while producing thick crude oil by thermal recovery with boiler steam, gets, from the boiler flue gas, liquid carbon dioxide and nitrogen for injection into the well and consequently gains favorable results on the crude oil output increase and environment protection.

DETAILED DESCRIPTION OF THE DRAWINGS

FIG. 1 is the structural diagram of the overall flow of the invention. In the diagram, mark "25" and "26" refer respectively to well-casing and gas injection tube for oil recovery.

PREFERRED EMBODIMENT OF THE INVENTION

The technological solution of the method in accordance with the invention is further specified as follows with the combination of the equipment and drawings provided by the invention.

EXAMPLE 1

As is demonstrated by the FIGURE, the equipment provided by the invention for the reclaim of carbon dioxide from boiler flue gas as well as for the liquefaction of the reclaimed carbon dioxide for well injection oil recovery comprises a boiler 1, a high pressure water pump 2, a tower scrubber 3, an induced draft fan 4, an absorber 5, a separation tank 6, a heat exchanger 7, a regenerator 8, a reboiler 9, a steam boiler 10, a water segregator 11, a carbon dioxide compressor 12, a purifier 13, a liquefier 14, a congealer 15, a rectifying tower 16, a condenser 17, a storage tank 18, a nitrogen compressor 19, a drying beds 20, an adsorption beds 21, a nitrogen pressurizer 22, a carbon dioxide pump 23 and a mixing tank 24.

The structure, assembly and installment of the equipment provided by the invention for the reclaim of carbon dioxide from boiler flue gas as well as for the liquification of the reclaimed carbon dioxide for well injection oil recovery are as follows:

The boiler 1 (using for example coal or gas) connects with the high pressure water pump 2 by pipelines; the steam outlet at the top of the boiler 1 connects with the mixing tank 24 by pipelines; the flue gas outlet at the top of the boiler 1 connects with the tower scrubber 3; the tower scrubber 3 connects with the absorber 5 by pipelines, and between them is equipped the induced draft fan 4; the absorber 5 connects respectively with the separation tank 6 and heat exchanger 7 by pipelines.

The boiler 1 is used for producing high-pressure steam.

As to boiler 1, the inner tubes may be high-pressure channels able to produce pressure of over 15 MPa; the fuel may be coal, crude oil or flammable gases; purified water for production is provided by the high-pressure pump 2 with pressure of over 15 MPa.

The tower scrubber 3 is used for the removal of sulfur dioxides and dusts in the flue gas.

The tower scrubber 3 is a packing tower. The packing material may be made of metals, plastics or ceramics as well as of charcoal, minerals or vegetable silk. The eluant may be water, alkalescent solution such as natrium carbonium solution or ammonia water etc. as well as sulfite solution.

The flue gas is washed in the tower scrubber 3 to remove the contained sulfur dioxide and solid particles and then enters into the absorber 5.

The absorber 5 and the regenerator 8 constitute the carbon dioxide reclaim system. The carbon dioxide adsorption liquid is introduced into carbon dioxide absorber 5 from the top down.

The said carbon dioxide adsorption liquid contains (by the total weight of the liquid), besides water, 50% by weight water solution of compound amines, 8% by weight polyoxinolum, 4% by weight sodium sulfide and 3% by weight sodium orthovanadate; The said water solution of compound amines is composed of (by the total weight of the solution) 20% by weight monoethanolamine (MEA) and 80% by weight N-methyldiethanolamine (MEDA). The adsorption liquid is used for the adsorption of carbon dioxide in the flue gas. The Carbon dioxide regenerator 8 is used for the regeneration of carbon dioxide absorbed within the adsorption liquid.

The absorber 5 and the regenerator 8 are both packing towers, in which the packing material may be made of metals, plastics or ceramics.

In the equipment of the invention, the induced draft fan 4 equipped between tower scrubber 3 and absorber 5 is used for providing power for the flow of flue gas in the upper part of the equipment of the invention. The induced draft fan 4 may be any type of blower suitable for the transmission of gases in pipelines.

The adsorption liquid flowing out from the inferior part of absorber 5 is rich in carbon dioxide and for this reason is called "rich liquid". The rich liquid is pumped into the heat exchanger 7 through pipelines.

The heat exchanger 7 connects with the regenerator 8 by pipelines. The rich liquid, which is heated through heat exchange in the heat exchanger 7, is pumped through pipelines into the regenerator 8 from the top of it.

Inside the regenerator 8, the rich liquid flows through the packing layer from the top down and is heated by the steam entering into the regenerator 8 from the bottom up and in this way, the carbon dioxide in the rich liquid is released (the adsorption of carbon dioxide is removed) and emitted from the top of the regenerator 8.

The steam boiler 10 connects with the reboiler 9 by pipelines. The reboiler 9 connects with the regenerator 8 by pipelines.

The reboiler 9 is a shell and tube heat exchanger. Solution coming from the bottom of the regenerator 8 in which the carbon dioxide has not been completely released enters into the tubes of the reboiler 9 into which steam from the steam boiler 10 is introduced. Therefore, the solution containing carbon dioxide is heated in the reboiler 9 and the carbon dioxide therein is released out and leaves from the top of the boiler 9 into the regenerator 8 and then is emitted out into the separation tank 11 from the top of the regenerator 8.

On the other hand, high temperature solution basically free from carbon dioxide (also referred to as "lean liquid") leaves from the bottom of reboiler 9 and enters into the heat exchanger 7 through pipelines and exchanges heat with the said low temperature solution rich in carbon dioxide coming from the outlet at the inferior part of absorber 5 ("rich liquid"), and then enters into absorber 5 from its top and continues to be adsorption liquid for absorbing carbon dioxide in the flue gas.

The regenerator 8 connects with the water segregator 11 by pipelines. The desorbed carbon dioxide gas enters into the water segregator 11 from the regenerator 8 through pipelines.

The water segregator 11 is used for the separation and removal of the slight quantity of liquid water contained in the carbon dioxide gas coming from the regenerator 8.

The water segregator 11 connects with the purifier 13 by pipelines. The Carbon dioxide compressor 12 is equipped between water segregator 11 and purifier 13. Gas coming from the water segregator 11 passes through the carbon dioxide compressor 12 and reaches the purifier 13, where the accompanied gaseous water is eliminated.

The purifier 13 connects with the liquefier 14 by pipelines; the liquefier 14 connects respectively with the congealer 15 and the rectifying tower 16 by pipelines.

The Purifier 13, the liquefier 14, the congealer 15 and the rectifying tower 16 compose a carbon dioxide liquefying system, in which, the purifier 13 is composed of two twin purifying beds packed with solid packing materials including aluminium oxide, silica gel, activated carbon or molecular sieve; the liquefier 14 is a "U"-shape heat exchanger or a shell and tube heat exchanger and the refrigeration is realized by low temperature liquid ammonia or freon supplied by the congealer; the rectifying tower 16 is a packing tower the bottom of which is equipped with heating assembly and the top of which has refrigeration and condensation circumfluence system which contains the condenser 17.

Gas coming from the purifier 13 enters into the liquefier 14 through pipelines and here is cooled into liquid phase.

The gas, which has been turned into liquid in the liquefier, enters through pipelines into the rectifying tower 16, where it is slightly heated to remove the slight quantity of oxygen, nitrogen and other light gases (e.g. hydrogen and methane).

The rectifying tower 16 connects respectively with the condenser 17 and the storage tank 18 by pipelines.

The removed slight quantity of oxygen, nitrogen and other light gases leaves from the top of the rectifying tower 16 and enters into the condenser 17 through pipelines and then is emitted from the outlet at the superior part of the condenser 17 out of the equipment system provided by the invention.

The condenser 17 is used for the reclaim of carbon dioxide emitted out from the rectifying tower 16; the said carbon dioxide returns to the rectifying tower 16 through pipelines from the inferior part of the condenser 17.

With the equipment of the invention, the content of carbon dioxide entering into the storage tank 18 from the inferior part of the rectifying tower 16 may reach as high as 99.9%. That is to say, liquid carbon dioxide with high purity may be gained successfully.

The storage tank 18 connects with the mixing tank 24 by pipelines. Between them is equipped the carbon dioxide pump 23.

The said liquid carbon dioxide of high purity is sent to the carbon dioxide pump 23 through pipelines and after pressurization, sent to the mixing tank 24, where it is mixed with pressurized nitrogen and/or pressurized steam and then injected into the oil well.

Depicted above is the flow of reclaim of carbon dioxide from boiler flue gas according to the present invention.

Depicted below will be the flow of reclaim of nitrogen from boiler flue gas according to the present invention.

Because of the absorbing effect of carbon dioxide absorber 5, the gas coming out from the top of the carbon dioxide absorber 5 basically contains no carbon dioxide. It is mostly nitrogen accompanied by slight quantity of oxygen and slimy liquid and gas water. The said gas coming out from the top of the carbon dioxide absorber 5 enters into the separation tank 6 through channels.

The separation tank 6 is used for the removal of the liquid water contained in the gas coming out from the top of the carbon dioxide absorber 5. The said liquid water is discharged from the outlet at the bottom of the separation tank 6.

After the liquid water is removed, the gas coming out from the top of the separation tank 6 mainly contains huge amount of nitrogen, slight amount of oxygen and slimy gas water.

The separation tank 6 connects with the nitrogen compressor 19 by pipelines, the nitrogen compressor 19 compresses the gas free from liquid water and increases its pressure.

The drying beds 20 are connected respectively with the nitrogen compressor 19 and the adsorption beds 21. The pressurized gas coming out from the compressor 19 enters into the drying beds 20 through pipelines. Filled with solid particle packing materials such as aluminium oxide, silica gel or molecular sieve, the drying beds 20 are composed by connection of two drying-bed spigot groups of the same volume and pipelines. Water is further eliminated out of the gas in the drying beds 20.

Gas coming out from the drying beds 20 enters through pipelines into the adsorption beds 21, where the slight amount of oxygen is removed.

The adsorption beds 21 are composed of two adsorption beds of the same volume in which solid particle packing materials are filled such as aluminium oxide, silica gel or molecular sieve. The two adsorption beds are connected with spigot groups and pipelines, and may be automatically operated by controlling spigots with PLC (Programmable Logical Controller).

Nitrogen of high purity is got after the oxygen is removed when the gas passes through the adsorption beds 21.

The adsorption beds 21 are connected with the well casing 25 and between them is equipped the nitrogen pressurizer 22. The high purity nitrogen coming from the adsorption beds 21 is pressurized when passing through the nitrogen pressurizer 22 and then injected into the gas injection tube for oil recovery.

The mixing tank 24 connects with the gas injection tube for oil recovery 26 by pipelines. With the mixing tank 24, the said reclaimed carbon dioxide and nitrogen from flue gas and the high-pressure steam produced from boiler 1 may be matched and mixed at various proportions for injection into the gas injection tube for oil recovery 26 for the exploitation of thick crude oil.

As is stated above, the equipment of the present invention for the reclaim and liquification of carbon dioxide from boiler flue gas as well as for the injection of the carbon dioxide into the well for oil recovery is able to efficiently reclaim the carbon dioxide and nitrogen from the flue gas of steam boiler producing steam for well injection. The reclaimed carbon dioxide and nitrogen may be injected into the well for thick crude oil recovery coupled with the steam generated by the boiler. The equipment provided by the invention fully utilizes the exhaust gas produced by the steam boiler for thick crude oil recovery and thereby greatly reduces the cost of thick crude oil recovery.

With the adoption of the equipment provided by the invention, carbon dioxide, nitrogen and high-pressure steam may be injected together with various combinations and at different proportions. In this way, technologies for thick crude oil recovery are enriched, enabling oil recovery arts diverse enough for more practical conditions and considerably increasing the exploitation efficiency of thick crude oil wells.

It can also be seen that, the flue gas and the harmful substances contained in it are basically cleaned up after treatment by the equipment of the invention, and thus pollution to the environment is consumedly decreased.

For these reasons, adoption of the equipment provided by the invention may greatly lower the cost as well as increase the efficiency of thick crude oil well exploitation and at the same time reduce obviously the pollution to the environment.

In addition, with the equipment of the invention, the carbon dioxide reclaimed from the boiler flue gas may be liquefied and stored in carbon dioxide cylinders. The stored carbon dioxide may be transferred to other places with transportation vehicles. So, carbon dioxide reclaimed from steam boilers at one oil well may be used in other wells.

Though the philosophy of the invention is exemplified with the combination of exemplary embodiments, technicians in this field have the right to understand and interpret the structures and various details exemplified in the specific implementary mode as just preferential examples that may realize the object of the invention, and construct, within the essential principle of the invention, on each technical characteristic of the invention various equipotent recombination, revisions or changes, which ought to be within the protected scope of the invention.

EXAMPLE 2

Take for example a coal boiler commonly used for oil recovery, which produces flue gas at 23 ton/hour. With the equipment stated in Example 1 and using the flue gas as raw material, carbon dioxide gas with purity of over 98%, the water content in which is less than 1.0%, may be reclaimed with the annual production capacity of 30,000 tons. Meanwhile, nitrogen gas with purity of over 93% may also be reclaimed with the production capacity of 36,000 ton/year. The reclaimed nitrogen contains oxygen (6.0% by volume), water (1.0% by volume), sulfur dioxide (<50 ppm) and nitrogen dioxides (<20 ppm).

Shown in the following Table 1 is the composition of the flue gas of the coal boiler in the method provided by the invention.

TABLE 1

| | Ingredient | Unit | Data |
|---|---|---|---|
| 1 | actual flue gas emission | m³/h | 46000.0 |
| 2 | actual flue gas temperature | °C. | 123.68 |
| 3 | content of $CO_2$ in the flue gas | % | 9.52 |
| 4 | content of $SO_2$ | % | 0.0029 |
| 5 | content of $N_2$ | % | 72.01 |
| 6 | content of $O_2$ | % | 6.958 |
| 7 | content of $H_2O$ | % | 11.510 |

The present example employs the same carbon dioxide adsorption liquid as that of Example 1, but is different from the latter in that the said water solution of compound is composed of 10% monoethanolamine (MEA) and 90% 2-amino-2-methyl-1-propanol (AMP).

The rich liquid coming from the bottom of the carbon dioxide absorber and having absorbed carbon dioxide is warmed when passing through the rich liquid heat exchanger and heated when passing through the rich-lean liquid heat exchanger and then sent to the top of the carbon dioxide regenerator and flows down through the packing layer. The packing materials within the carbon dioxide absorber may be made of metals, plastics or ceramics known to public in current available technologies as well as of charcoals, minerals or vegetable silks.

The following data are got after the procedures described above with the equipment in accordance with the invention.

The recoveries of carbon dioxide and nitrogen are respectively 80% and 95% with regard to the said boiler in Example 2, the running period of it tentatively set on 7200 hours every year. The flows of the reclaimed carbon dioxide and nitrogen as well as of the produced steam are shown in the following Table 2.

TABLE 2

| | Process Scale and Product Output | | | |
|---|---|---|---|---|
| | Process Scale | Product Output | | |
| Product | (t/a) | kg/h | k mol/h | Nm³/h |
| carbon dioxide | 30000 | 4300 | 97.7 | 2176.2 |
| nitrogen | 36000 | 5000 | 178.6 | 4000 |
| steam | 165600 | 23000 | 1278 | 28627 |

Exhaust Gas: The exhaust gas is basically free from pollutants, and the slight amount of sulfides is neutralized in water-washing and alkaline solvents. Having met the national emission standard, the exhaust gas may be emitted directly into the atmosphere. In addition, almost no waste is discharged.

What we claimed is:

1. A method for the reclaim of carbon dioxide and nitrogen from boiler flue gas, comprising the following steps of:
   Washing flue gas with water for dust removal and then making water-washed flue gas to contact with a sulfite solution for desulfurization;
   Reusing adsorption liquid after sulfide products are obtained;

Separating desulfurized flue gas by cyclone and sending desulfurized flue gas by an induced draft fan to a carbon dioxide absorber, wherein part of the carbon dioxide is absorbed by a carbon dioxide adsorption liquid and exhaust gas, which is emitted from the top of the carbon dioxide absorber, is, after the contained water is separated out, used as the material gas for the production of nitrogen, the said carbon dioxide adsorption liquid includes, besides water, 20-60 wt % water solution of compound amines, 5-10 wt % polyoxinolum, 1-5 wt % antioxygen and 1-5 wt % corrosion inhibitor based on the total weight of the carbon dioxide adsorption liquid;

Freeze drying a nitrogen stream separated from the top of the carbon dioxide absorber for dehydration;

providing liquid rich in carbon dioxide to a carbon dioxide heat exchanger and then to a rich-lean liquid heat exchanger and, after the heat is reclaimed, to a carbon dioxide regenerator;

providing the adsorption liquid rich in carbon dioxide into the carbon dioxide regenerator from the top, wherein part of the carbon dioxide is desorbed by stripping, and then providing carbon dioxide adsorbed liquid into a reboiler for further desorption of the carbon dioxide;

Making liquid lean in carbon dioxide flow out of the carbon dioxide regenerator from the bottom via exchanging heats in the rich and/or lean liquid heat exchangers into a water cooler and, after being cooled down, providing the liquid lean in carbon dioxide into the carbon dioxide absorber;

Separating the desorbed carbon dioxide coupled with water vapor, after heat exchange and cooling, for the removal of the water, to resolve carbon dioxide as a product with purity of over 98.0%; and providing condensate water separated from regenerated gas to the carbon dioxide regenerator.

2. The method according to claim 1, wherein a water solution of the said compound amine includes 10-30% by weight component (A) selected from a group consisting of monoethanolamine (MEA), diethanolamine (DEA) and piperazine (PZ) or combinations thereof; and 70-90% by weight component (B) selected from a group consisting of 2-amino-2-methy-1-propanol (AMP), N-methyldiethanolamine (MEDA) and triethanolamine (TEA) or the combinations thereof based on the total weight of the solution.

3. The method according to claim 1, wherein the carbon dioxide adsorption liquid further comprises a sodium orthovanadate as a corrosion inhibitor.

4. The method according to claim 1, wherein the carbon dioxide adsorption liquid further comprises a sodium sulfite or the mixture thereof with copper acetate as an antioxygen agent.

5. The method according to claim 1, wherein the said carbon dioxide adsorption liquid has a density of 0.98~1.06 g/ml, a kinetic viscosity of 31.5~35.0 $mm^2$/s, a surface tension of 0.04~0.05 N/m and a specific heat of 0.84~0.90 cal/g° C.

6. The method according to claim 1, wherein the said sulphite solution is a ferrous sulfate solution.

7. The method according to claim 1, wherein the carbon dioxide is introduced into the lyophilizer and is pressurized at the temperature of lower than 10° C. to 0.7 MPa from normal pressure.

* * * * *